United States Patent [19]

Kennard et al.

[11] Patent Number: 4,573,365
[45] Date of Patent: Mar. 4, 1986

[54] POWER TRANSMISSION

[75] Inventors: Reed H. Kennard, Bixby; Lewis R. Miller, Tulsa, both of Okla.

[73] Assignee: Vickers, Incorporated, Troy, Mich.

[21] Appl. No.: 582,528

[22] Filed: Feb. 23, 1984

[51] Int. Cl.$^4$ .............................................. F16H 37/00
[52] U.S. Cl. ..................... 74/15.8; 74/15.86; 74/475; 74/527; 192/67 R; 192/99 S
[58] Field of Search .................. 74/15.8, 15.82, 15.86, 74/475, 527; 192/20, 67 R, 99 S, 114 R

[56] References Cited

U.S. PATENT DOCUMENTS

| | | | |
|---|---|---|---|
| 2,019,073 | 10/1935 | Cooper et al. | 192/99 S |
| 2,933,928 | 4/1960 | Wagner | 74/15.86 |
| 3,270,580 | 9/1960 | Wagner | 74/475 |

Primary Examiner—Albert J. Makay
Assistant Examiner—David W. Westphal
Attorney, Agent, or Firm—Barnes, Kisselle, Raisch, Choate, Whittemore & Hulbert

[57] ABSTRACT

A power take-off device comprising a housing having spaced walls, an input shaft rotatably mounted in a first set of aligned openings in the walls, and an output shaft rotatably mounted in a second set of aligned openings in the walls. A pair of gears is interposed between the walls and rotatably mounted on the input shaft. The housing having an opening through which said one gear extends for engagement with a power source. A third gear is fixed on the output shaft and meshes with the teeth on the other gear. The first and second gears have annular gear portions and an annular clutch member having teeth engage a gear portion of one of the first and second gears to a position wherein said internal teeth engage the gear portions of both first and second gears. The clutch member is moved by a mechanical shift mechanism.

5 Claims, 8 Drawing Figures

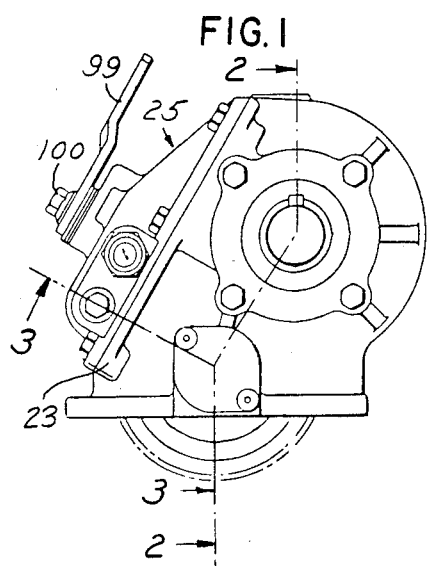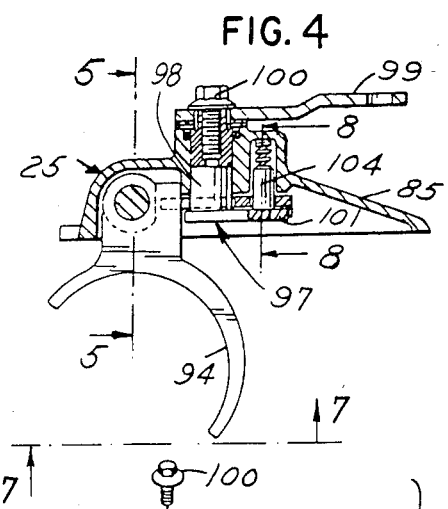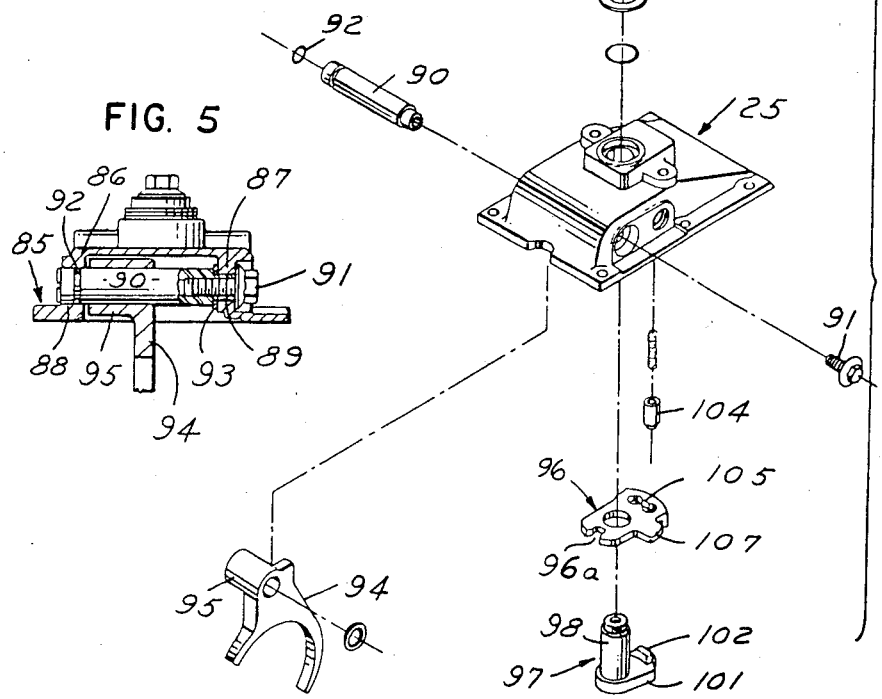

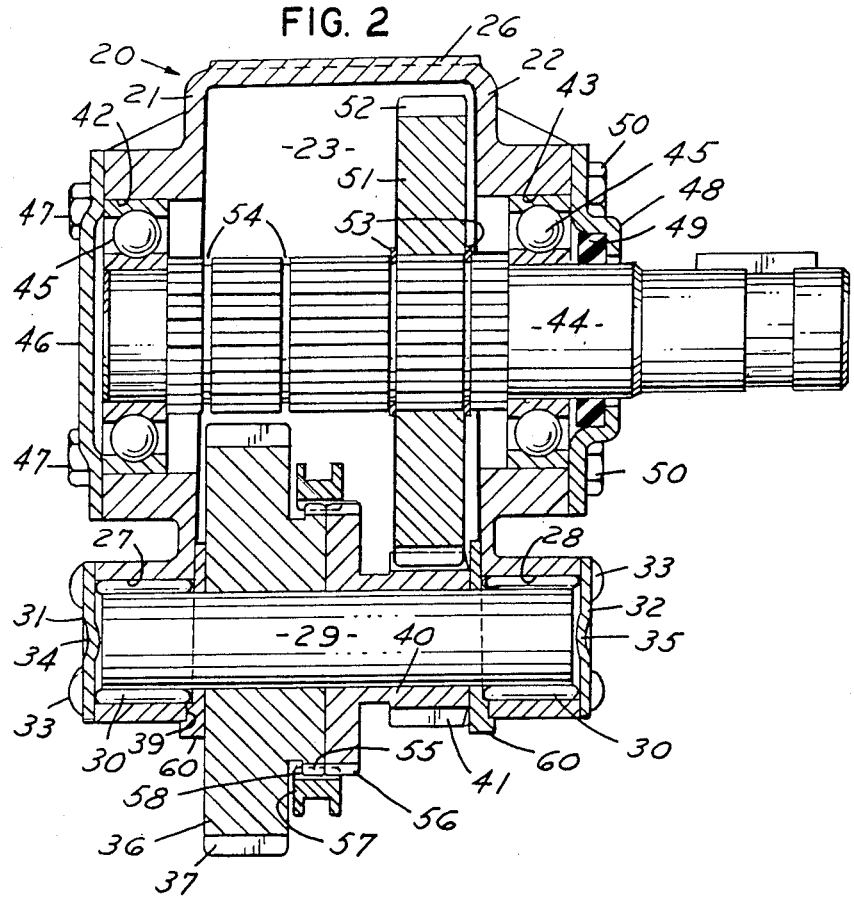

POWER TRANSMISSION

BACKGROUND AND SUMMARY OF THE INVENTION

In vehicles such as trucks and other off the road vehicles, it is common to utilize the power from the transmission to operate various components such as hydraulic pumps and mechanical devices.

Such mechanisms are known as power take-off devices and generally comprise a housing in which gears are supported. The housing is mounted on the transmission at an opening generally provided by the transmission manufacturer and one of the power take-off gears projects through the opening into engagement with the gear of the transmission to receive the input from the transmission. The power take-off device also includes an output shaft through which the output is provided and intermediate gears connecting the one gear and the output shaft. The device also includes means for engaging the gears to engage the power take-off. A typical shifting device is shown in U.S. Pat. No. 3,270,580.

Because of space limitations in the vehicle, it is desirable to provide compact power take-off devices that have a small envelope.

In one commonly used design, the power take-off includes a cast iron housing with a fixed shaft on which an input gear is rotatably mounted by bearings. A second gear also mounted on bearings is axially movable on the fixed shaft for engagement with a third gear on an output shaft. In order to provide a range of horse power capacities and torque, it has been heretofore necessary to design each power take-off for a particular use. In order to repair or attempt to change the gear ratios, it has been necessary to remove the fixed input shaft, replace the bearings and the gears.

Among the objectives of the invention are to provide a power take-off which incorporates a novel shifting mechanism.

DESCRIPTION OF THE DRAWINGS

FIG. 1 is a side elevational view of a power take-off device.

FIG. 2 is a sectional view taken along the line 2—2 in FIG. 1.

FIG. 4 is a sectional view of the shifter mechanism.

FIG. 5 is a sectional view taken along the line 5—5 in FIG. 4.

FIG. 6 is an exploded view of the shifter mechanism shown in FIG. 1.

DESCRIPTION

Figure 3:
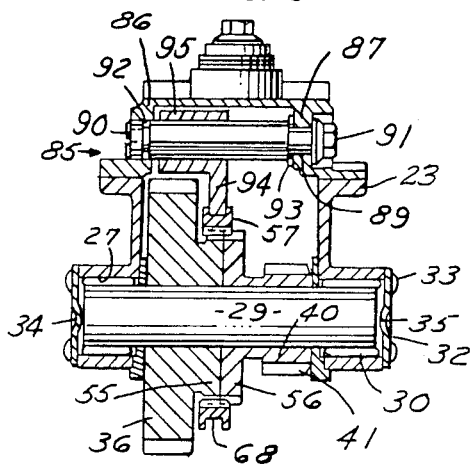
FIG. 3 is a sectional view taken along the line 3—3 in FIG. 1.

Referring to FIGS. 1 and 2, the power take-off device comprises a housing 20 that is die cast and includes spaced side walls 21, 22 an end wall 23 having an opening closed by a shifter mechanism 25, as presently described. The housing further includes a top wall 26. The bottom of the housing is open, as presently described.

The walls 21, 22 include a first set of aligned openings 27, 28 in walls 21, 22 in which a cylindrical input shaft 29 is rotatably mounted by needle bearings 30. Cap covers 31, 32 in the form of metal plates are fixed over the ends of the openings 27, 28 by screws 33 for closing the openings 27, 28. The length of the shaft 29 is slightly less than the distance between the caps 31, 32 so that the shaft 29 has limited axial movement. The caps 31, 32 preferably include axially inwardly extending portions 34, 35 for laterally locating the floating shaft which are preferably hardened as in the shaft 29.

An input gear 36 is rotatably mounted on the shaft 29 and has an annular array of teeth 37 for engagement with a gear of a transmission on which the power take-off device is mounted by bolts extending through a flange 38. The gear 36 extends through the open end 39 of the housing. A second gear 40 is also rotatably mounted on shaft 29 and has an annular array of teeth 41. The housing 20 further has a second set of aligned openings 42, 43 in walls 21, 22 in which an output shaft 44 is rotatably mounted by ball bearings 45. Opening 42 is closed by a cover 46 held in position by bolts 47 and the other opening 43 has a retainer plate 48 supporting a seal 49, the retainer plate 48 being held in position by bolts 50. A gear 51 having an annular array of teeth 52 is splined to the shaft 44 and held in position by snap rings 53 for engagement with the teeth 41 of gear 40. Shaft 44 includes additional grooves 54 for positioning the gear 51 in any desired position as when it is desired to change the shaft 44 so that it extends to the left rather than to the right out of the power take-off.

In order to engage and disengage the power from the transmission, a clutch and shifter mechanism are provided. Gears 36, 40 are provided with a gear portion 55, 56 respectively, which has annular sets of teeth of the same diameter and a clutch member 57 with internal teeth 58 is shiftable from a position where it engages only the teeth of one gear portion to a position where it engages the teeth of both gear portions 55, 56 by a shifter mechanism as presently described. When the clutch 57 is engaged power is transmitted from the gear 36 through gear 40 to gear 51 and, in turn, the output shaft 44.

When the power take-off is disengaged, the input gear 66 rotates freely on the shaft 29. The tolerances between the outer diameter of shaft 29 and the inner diameter of gear 66 are such that a thin layer of film of oil from the oil in the housing 20 provides sufficient lubrication to prevent wear between the metal to metal surfaces. When the power take-off is engaged, the input gear 36 and gear 40 are rotated and the load causes the shaft 29 to rotate in bearings 30.

In order to obviate the need for any machining of the inner surfaces of walls 21, 22 of the die cast housing with respect to the shaft 29, tapered washers 60 are provided between the surfaces of the walls 21, 22 and the respective gears 36, 40. Each washer has an outer surface that has the same transverse angle as the taper of the wall surface, namely about 1°, and an inner surface that is at an angle so that the inner surface is perpendicular to the axis of the shaft 29 and respective gears 36, 40. Tapered washers can also be used in power take-off devices incorporating shafts which are similarly mounted to obviate the need for machining.

Figure 7:
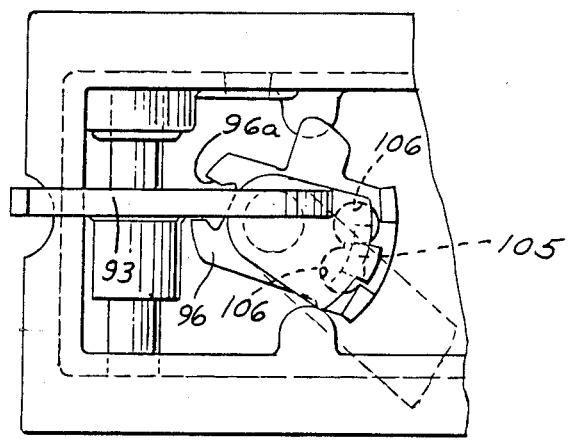
FIG. 7 is a bottom view taken along the line 7—7 in FIG. 4.
Figure 8:
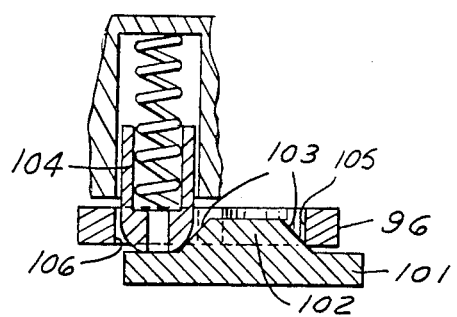
FIG. 8 is a fragmentary sectional view taken along the line 8—8 in FIG. 4.

Referring to FIGS. 1, 3, 4, 5, 6, 7 and 8, power take-off device 20 is shown wherein the shifting mechanism comprises a mechanical arrangement that can be connected by a cable or other linkage to the operator's cab of the vehicle.

The shift mechanism 25 comprises a die cast housing 85 (FIG. 4) that is removably mounted on the housing of the power take-off device by bolts. The housing 85 includes side walls 86, 87 having aligned openings 88, 89, opening 88 (FIG. 5) having a greater diameter than opening 89. A shaft 90 which is generally cylindrical is positioned in opening 88 and has a portion of reduced diameter extending through the opening 89 of smaller diameter and a screw 91 is threaded into the end of the shaft 90 clamping the shaft in position. The shaft 90 includes an O-ring 92 in a peripheral groove of the cylindrical portion defining a seal with the opening 88 and a washer 93 interposed between the end of the larger cylindrical portion and the other wall 87, the washer 93 including a resilient integral seal therewith. Such a washer is well known in the art. Such a construction and use of the die cast cover eliminates the need to machine the cover for the shaft.

Referring to FIGS. 5-8, the yoke 94 includes an enlarged portion 95 slidable on the cylindrical portion of the shaft 90 providing lateral stability to the yoke. The yoke 94 is engaged by a yoke plate 96 with the yoke 94 extending into a notch 96a in the plate 96. The plate 96 is pivotally mounted within the housing 85 by a trigger 97 that includes a shaft portion 98 extending through an opening in the housing 85 of the housing so that an operating arm 99 can be engaged with teeth on the periphery thereof. A bolt 100 holds the arm 99 against the housing 85 with interposed washers and an O-ring inserted in the die cast O-ring recess. The trigger 97 further includes a laterally extending trigger plate 101 that includes a circumferentially extending cam 102 having ramps 103 that function to move a spring loaded detent 104 axially. The cam 102 extends into a slot 105 in plate 96 that has enlarged ends or holes 106 into which the spring loaded detent 104 is adapted to engage. When the arm 99 is moved, the trigger plate 101 is rotated rotating the yoke plate 96 so that the detent 104 moves up one of the ramps 102 and cams the detent 104 upwardly thus unlocking the yoke plate 96 out of one of the holes 106, across the narrow portion of the slot 105 and then back down into the other hole 105, thus locking the yoke plate 96 in a new position. In this manner the yoke 94 is shifted from one position to another. Rotary motion of the cam is thus converted to linear motion of the yoke 94 in moving from one position to the other. Thus, accidental engagement of disengagement of the power take-off is prevented. The yoke 94, trigger 97, and yoke plate 96 are necessarily made of powdered metal. A tang 107 on plate 96 operates a single switch as in the other form of shaft mechanism.

We claim:

1. A shifter mechanism for a power take-off device comprising a housing member which includes an opening between spaced walls closed,
    said shifter mechanism comprising a cover housing adapted to close the opening of the housing member power take-off of a power take-off device,
    a trigger member,
    said trigger member having an integral axial portion,
    said cover housing having an opening through which said axial portion extends,
    lever means engaged with the portion of said axial portion which is external of the housing for rotating the trigger member,
    said trigger member including an integral transverse trigger plate,
    a yoke plate rotatably mounted on the axial portion of said trigger member,
    said yoke plate extending transversely of the axis of said axial portion of the trigger member,
    a yoke,
    means for mounting said yoke for movement along an axis transverse to the axis of said axial portion of said trigger member,
    said yoke plate including a peripheral notch into which a portion of the yoke extends,
    said yoke plate including spaced openings connected by a slot,
    a spring loaded detent mounted in said cover housing and selectively engaging one of said openings,
    said trigger plate of said trigger member having an cam extending into said slot in said yoke plate such that when the trigger member is rotated, said detent is moved so that the yoke plate can be moved to, in turn, cause movement of the yoke by engagement with the notch so that the yoke translates axially between a position wherein only one of a pair of gears is engaged and a position wherein both gears are engaged.

2. The shifter mechanism set forth in claim 1 wherein said cover housing has spaced openings,
    said means for mounting said yoke for movement comprising a shaft having a portion thereof extending through one of said openings,
    annular sealing means interposed in a groove in said shaft for engaging the side of said opening and providing a seal,
    the other end of said shaft being reduced in cross section,
    said other opening having a lesser diameter than the first mentioned opening with the reduced diameter portion of said shaft extending through said other opening, and
    fastener means externally of said housing for engaging the other end of said shaft, sealing means interposed between the shaft and the other wall for providing a seal.

3. The shifter means set forth in claim 2 wherein said fastening means comprising a screw threaded into the end of said shaft having a reduced diameter and a sealing washer interposed between the head of the screw and said washer.

4. The shifter mechanism set forth in claim 2 wherein said cover housing is die cast and the openings are as cast without machining.

5. The shifter mechanism set forth in claim 1 wherein said yoke, trigger member and yoke plate are made of powdered metal.

* * * * *